United States Patent
Heid et al.

(10) Patent No.: US 8,443,763 B2
(45) Date of Patent: May 21, 2013

(54) EQUINE SUPPORT BOOT

(75) Inventors: Ward Heid, Alvarado, TX (US); Kirby A. Smith, Fort Worth, TX (US); Stephen W. Coder, Crowley, TX (US)

(73) Assignee: Western Legacy Sales, LLC, Alvarado, TX (US)

( * ) Notice: Subject to any disclaimer, the term of this patent is extended or adjusted under 35 U.S.C. 154(b) by 289 days.

(21) Appl. No.: 12/298,256

(22) PCT Filed: Feb. 26, 2007

(86) PCT No.: PCT/US2007/004880
§ 371 (c)(1),
(2), (4) Date: Oct. 23, 2008

(87) PCT Pub. No.: WO2008/105757
PCT Pub. Date: Sep. 4, 2008

(65) Prior Publication Data
US 2009/0094949 A1    Apr. 16, 2009

(51) Int. Cl.
*A01K 13/00* (2006.01)
*B68C 5/00* (2006.01)

(52) U.S. Cl.
USPC .............................. 119/856; 54/82

(58) Field of Classification Search ....... 54/82; 119/856, 119/863, 860
See application file for complete search history.

(56) References Cited

U.S. PATENT DOCUMENTS

| | | | |
|---|---|---|---|
| 1,417,742 A * | 5/1922 | Keller | 54/82 |
| 1,899,471 A * | 2/1933 | Meyer | 54/82 |
| 2,194,921 A * | 3/1940 | Wagner, Jr. | 54/82 |
| 2,246,100 A * | 6/1941 | Marzani | 54/82 |
| 2,449,410 A | 9/1948 | Polinsky | |
| 2,512,925 A | 6/1950 | Eggeman | |
| 3,124,919 A | 3/1964 | Thompson | |
| 3,209,517 A | 10/1965 | Hyman | |
| 5,107,827 A | 4/1992 | Boyd | |
| 5,115,627 A | 5/1992 | Scott | |
| D329,108 S | 9/1992 | Boyd | |
| 5,363,632 A | 11/1994 | Armato | |
| 5,579,627 A | 12/1996 | Vogt | |
| 5,816,032 A | 10/1998 | Vogt | |
| 5,910,126 A * | 6/1999 | Wilson et al. | 602/75 |
| 5,926,843 A | 7/1999 | Winchester | |
| 6,151,873 A | 11/2000 | Rogers | |
| 6,918,236 B2 | 7/2005 | Springs | |

OTHER PUBLICATIONS

Canadian Office Action from counterpart CA Application No. 2,680,985 issued by the Canadian Intellectual Property Office on Mar. 9, 2011.
Canadian Office Action from counterpart CA Application No. 2,682,683 issued by the Canadian Intellectual Property Office on Mar. 8, 2011.
International Search Report from corresponding PCT application No. PCT/US 07/04880 dated Nov. 28, 2007.
International Preliminary Report on Patentability from corresponding PCT application No. PCT/US 07/04880 dated Sep. 3, 2009.
Notice of Allowance issued by the Canadian Intellectual Property Office from corresponding Canadian Patent Application No. 2,682,683; mailed Feb. 3, 2012.

* cited by examiner

*Primary Examiner* — Son T Nguyen
(74) *Attorney, Agent, or Firm* — James E. Walton; J. Oliver Williams

(57) ABSTRACT

An equine support boot comprises a base portion, at least one upper strap, a concave portion formed in the base portion, an orthopedic pad disposed in the concave portion, and at least one sling strap connected to the base portion, the sling strap being configured to apply an upward force on the concave portion.

15 Claims, 5 Drawing Sheets

EQUINE SUPPORT BOOT

TECHNICAL FIELD

The present invention relates to equine support boots. In particular, the present invention relates to support boots for the lower limbs of horses.

DESCRIPTION OF THE PRIOR ART

For centuries, the bond between man and horse has been a strong one. At times in history, the survival of people would not have been possible without horses. Today, although most people are no longer dependent upon horses, the livelihoods of many people are still dependent upon access to strong, healthy horses. Indeed, the equine industry has never been stronger. Every day, around the world, thousands of horses are bought, sold, and traded for a wide variety of uses. Some are race horses, some are show horses, and some simply work day in and day out on farms and ranches throughout the world. Regardless of how they are used, horses must be cared for and maintained if they are to continue to be healthy, strong, and valuable.

Each year, vast sums are money are spent on the health and maintenance of horses. Hundreds of millions of dollars are spent on tools, tack, equipment, gear, supplies, accessories, training, and veterinary services to ensure that horses remain healthy and fit. Not only are horses treated after they have become injured, but significant resources are expended to prevent injuries from ever occurring. In recent years, the emphasis on prevention of injuries to horses has increased dramatically. Significant strides have been made in the areas of medicine, education, training, and equipment to help reduce the types and numbers of injuries sustained by horses.

One area of the equine industry that has seen tremendous growth is protective wear for horses' legs. These days, a myriad of products are available to protect a horse's legs from injury, including many different types of ankle boots, skid boots, splint boots, knee boots, support boots, and leg wraps. These products often offer new designs and incorporate new materials. Unfortunately, some of these products perform their advertised and intended purposes, and some do not. For example, some boots are advertised as support boots, but provide little or no support whatsoever.

Thus, although there have been significant developments in the area of equine support boots, considerable shortcomings remain.

BRIEF DESCRIPTION OF THE DRAWINGS

The novel features believed characteristic of the equine support boot of the present application are set forth in the appended claims. The equine support boot of the present application itself, however, as well as a preferred mode of use and further objectives and advantages thereof, will best be understood by reference to the following detailed description of an illustrative embodiment when read in conjunction with the accompanying drawings, wherein:

DESCRIPTION OF THE PREFERRED EMBODIMENT

The equine support boot of the present application provides support to the fetlock joint and the bones, tendons, and ligaments, and other structures associated with the fetlock joint. The support boot restricts and selectively controls the movement of the fetlock joint. The support boot may be used both as an injury prevention device and as a therapeutic device for horses that have already been injured. For horses that have already been injured, the support boot provides stability in the rehabilitation process, which allows the horse to react better to treatment. Use of the support boot during rehabilitation of a lame horse can reduce the overall time required to rehabilitate the horse.

The support boot may be utilized in a wide variety of configurations. Although the support boot is described herein with respect to an orthopedic device, the support boot may also be configured for use as a skid boot to add cushioning between a horse's fetlock joint and the ground, or for use a splint boot to add support, cushioning, and protection from crossover injuries.

When applied, the support boot extends from the proximal cannon bone to the distal pastern. The support boot covers and protects areas proximal to the fetlock joint, and provides support to the flexor tendons and suspensory ligament by decreasing the palmar/plantar movement, i.e., 'bowing,' of these structures during load-bearing. The area of coverage and the materials used in the construction of the support boot and its component parts also provides protection from blunt force injuries, such as over-reach, interference, run-down injuries, and others.

The support boot also provides additional load-bearing support by the incorporation of a force-resistant orthopedic pad disposed below the level of the fetlock. When the support boot is applied to a horse's lower leg, the orthopedic pad fits snuggly between the palmar/plantar aspect of the proximal pastern and the ventral portion of the seasmoids, i.e., the rear, bottom portion of the fetlock. This added support and control decreases the extension of the fetlock joint, thereby decreasing the tensile stress that can occur in the suspensory ligament and the flexor tendons during load-bearing.

Figure 1:
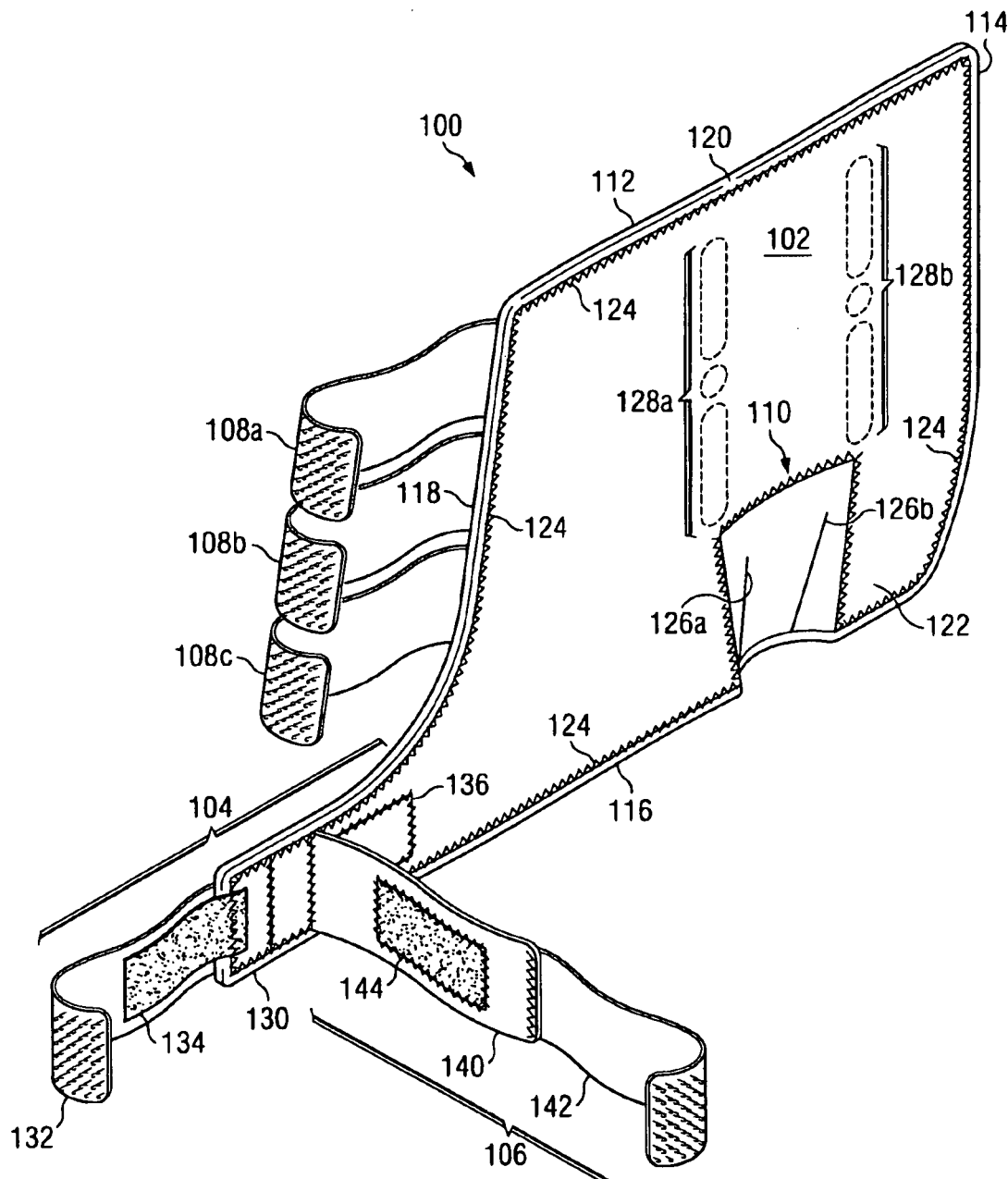
FIG. 1 is a perspective view of an equine support boot according to the present application.

Referring to FIG. 1 in the drawings, the preferred embodiment of an equine support boot 100 is illustrated. Support boot 100 comprises a base portion 102, a first sling strap 104, a second sling strap 106, one or more upper straps 108a, 108b, and 108c, a concave portion 110, and an orthopedic pad 200 (see also FIGS. 5 and 6A-6D). Base portion 102 includes a top edge 112, a rear edge 114, a bottom edge 116, and a front edge 118. Base portion 102 is formed by one or more layers of compliant materials. For example, in the preferred embodiment, base portion 102 is formed by an inner neoprene layer 120 that is bonded on an exterior surface to and an outer loop fabric layer 122. Loop fabric layer 122 is preferably made of or includes an unbroken loop fabric. A thin knit fabric is preferably bonded to the interior surface of neoprene layer 120 to protect and enhance the performance of neoprene layer 120. Loop fabric layer 122 forms the loop portion of a hook and loop type bond between first sling strap 104 and base portion 102, and between second sling strap 106 and base portion 102, as explained in more detail herein. Stitching 124 along edges 112, 114, 116, and 118 prevents neoprene layer 120, the thin knit fabric, and loop fabric layer 122 from delaminating. Upper straps 108a, 108b, and 108c are adjustable and ensure that the upper portion of support boot 100 is snuggly and securely wrapped around the horse's lower leg above the fetlock joint. Concave portion 110 is preferably formed in or adjacent to bottom edge 116, and is shaped by at least one pleat, such as pleats 126a and 126b, formed in base portion 102. Bottom edge 116 may curve upwardly adjacent concave portion 110, and may also curve upwardly near first sling strap 104 to aid in providing a snug fit around the horse's leg. Support wedge 200 is disposed in the interior region of concave portion 110.

The exterior surface of base portion 102 at concave portion 110 may optionally be coated, treated, or overlaid with a tough, durable material, such as nylon, Kevlar, rubber, plastic, or other suitable materials, to prevent damage to base portion. This feature is particularly useful in embodiments in which support boot is adapted for use as a skid boot. It will be appreciated that such treatment or addition to concave portion 110 may be integral with concave portion, may be bonded to concave portion 110, or may be releasably coupled to concave portion 110.

Base portion 102 may also include one or more optional tendon support members 128a and 128b. Tendon support members 128a and 128b are preferably semi-rigid, compliant structures that extend inwardly from base portion 102 and are configured and arranged to engage the tendon grooves the horse's lower leg. When support boot 102 is applied to the lower leg of a horse, tendon support members 128a and 128b provide lateral support and stabilization to the flexor tendons, the suspensory ligament, the sesamoidean ligaments, the sesamoid bones, and other tendons, ligaments, and bones in the area of the fetlock joint and lower pastern. In addition, tendon support members 128a and 128b ensure that support boot 100 is properly aligned during application to the horse's lower leg, and prevent rotation of support boot 100 about the horse's leg during operation.

Tendon support members 128a and 128b may be implemented in a wide variety of materials, shapes, and sizes. For example, tendon support members 128a and 128b may be integral with and formed of the same material as base portion 102, or may be formed of a different material, such as nylon, leather, rubber, or plastic, and may be coated or treated with other compliant materials. In those embodiments in which tendon support members 128a and 128b are formed of alternative materials, tendon support members 128a and 128b may be bonded to base portion 102 or secured into slots, pouches, or pockets in base material 102. In an another embodiment, tendon support members 128a and 128b may be removably placed into slots, pouches, or pockets. This latter embodiment allows the user to choose whether tendon support members are used or not on a case-by-case basis. As is shown, tendon support members 128a and 128b may comprise elongated ribs, circular buttons, oval ridges, and other shapes, either alone or in combination with each other. In addition, tendon support members 128a and 128b may have custom configurations of shapes and materials that are selectively tailored for particular maladies, applications, or individual horses.

Another optional feature of support boot 100 is a splint pad (not shown). The addition of the splint pad allows support boot to function also as a splint boot. The splint pad comprises an additional layer or layers of padding in a generally upright configuration. The splint pad is usually wider than tendon support members 128a or 128b and provides support, cushioning, and protection from crossover injuries. In those embodiments that include the splint pad, it may be desirable to eliminate second sling strap 106.

First sling strap 104 comprises an extension portion 130, a first connector portion 132, a first receiver portion 134, and a second connector portion 136. In the preferred embodiment, extension portion 130 is formed as an elongated extension of base portion 102 and extends outward from the corner formed by the intersection of bottom edge 116 and front edge 118. First connector portion 132 is preferably attached to extension portion 130 by stitching. First connector portion 132 is formed from hook-type fabric and functions as the hook portion of a hook and loop type bond between first sling strap 104 and base portion 102. First receiver portion 134 is formed by loop-type fabric and functions as a portion of the loop portion of a hook and loop type bond between second sling strap 106 and base portion 102. First receiver portion 134 is stitched or otherwise bonded to the exterior surface of connector portion 132 and, as is shown, may also extend over onto a portion of the exterior surface of extension portion 130. Second connector portion 136 is stitched or otherwise bonded to the interior surface of extension portion 130 and functions as the hook portion of a hook and loop type bond between first sling strap 104 and base portion 102 between pleats 126a and 126b.

Second sling strap 106 comprises a tab portion 140, a third connector portion 142, and a fourth connector portion 144. Tab portion 140 is preferably formed of the same laminar material as base portion 102 and is attached to extension portion 130 of first sling strap 104 by stitching. Third connector portion 142 is preferably attached to tab portion 140 by stitching. Third connector portion 142 is formed from hook-type fabric and functions as the hook portion of a hook and loop type bond between second sling strap 104 and the combination of base portion 102 and first receiver portion 134. Fourth connector portion 144 is stitched or otherwise bonded to the interior surface of tab portion 140. Fourth connector portion 144 is formed from hook-type fabric and functions as the hook portion of a hook and loop type bond between second sling strap 106 and extension portion 130. It is preferred that fourth connector portion 144 be aligned with second connector portion 136 during installation of support boot 100 onto the horse's leg.

Referring now also to FIGS. 2-5 in the drawings, support boot 100 is shown installed around the fetlock joint and lower leg of a horse. As is shown, support boot 100 extends from the proximal cannon bone to the distal pastern. Although many of the components of support boot 100 are constructed from compliant materials, when stretched and applied to a horse's lower leg, support boot 100 forms a strong and rigid support structure. This feature allows support boot 100 to cover and protect the areas proximal to the horse's fetlock joint, and provides support to the flexor tendons and suspensory ligament by decreasing the palmar/plantar movement, i.e., "bowing," of these structures during load-bearing. In addition, because support boot 100 is formed of generally padded, compliant materials, the configuration and construction of support boot 100 provides protection from blunt force injuries, such as over-reach, interference, run-down injuries, and others.

Figure 4:
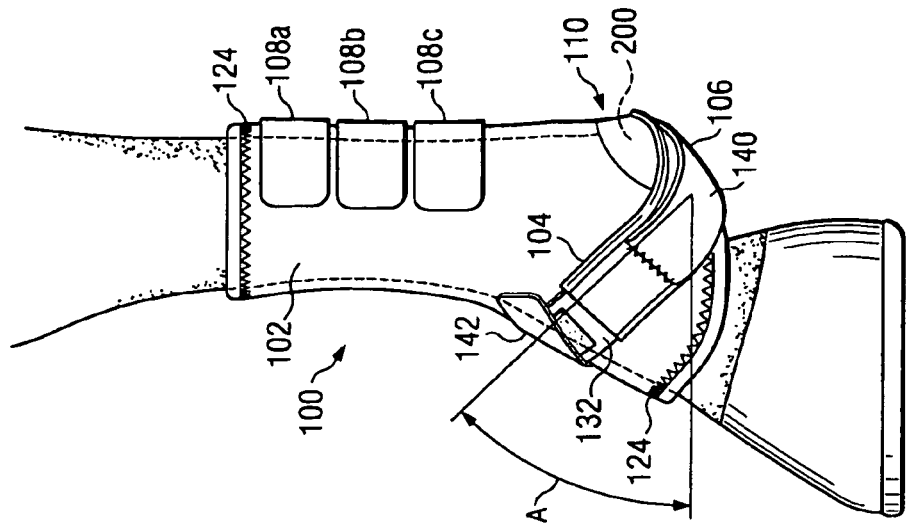
FIG. 4 is a left side view of the support boot of FIG. 1 installed onto the lower leg of a horse.
Figure 3:
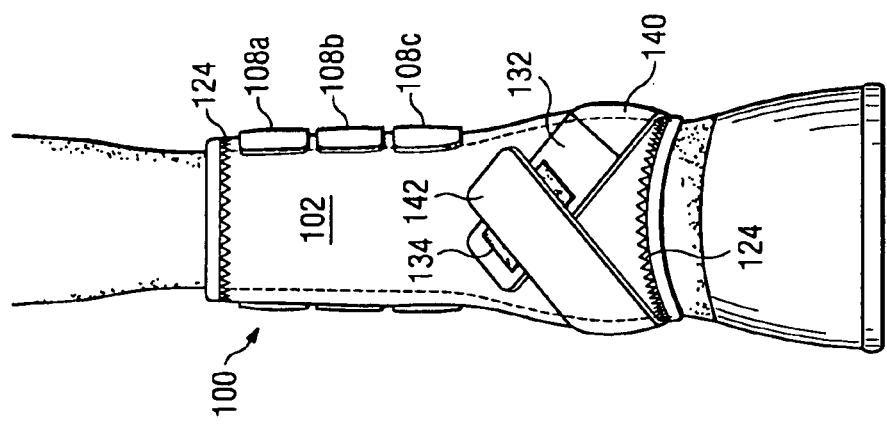
FIG. 3 is a front view of the support boot of FIG. 1 installed onto the lower leg of a horse.
Figure 2:
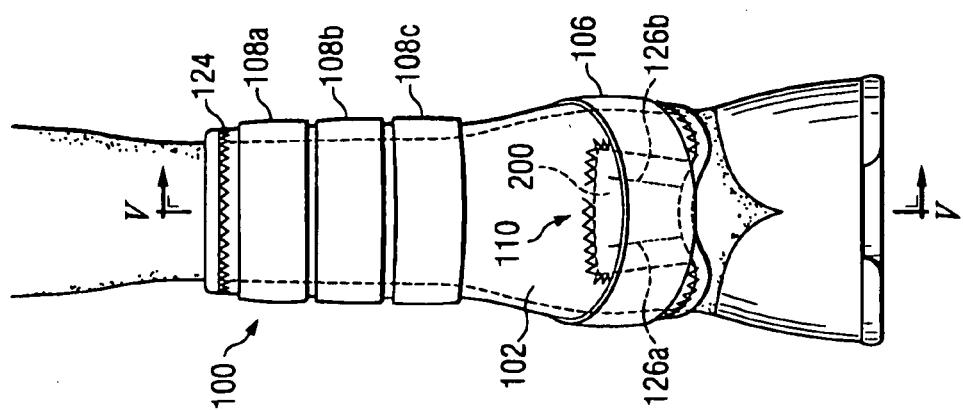
FIG. 2 is a rear view of the support boot of FIG. 1 installed onto the lower leg of a horse.
Figure 5:
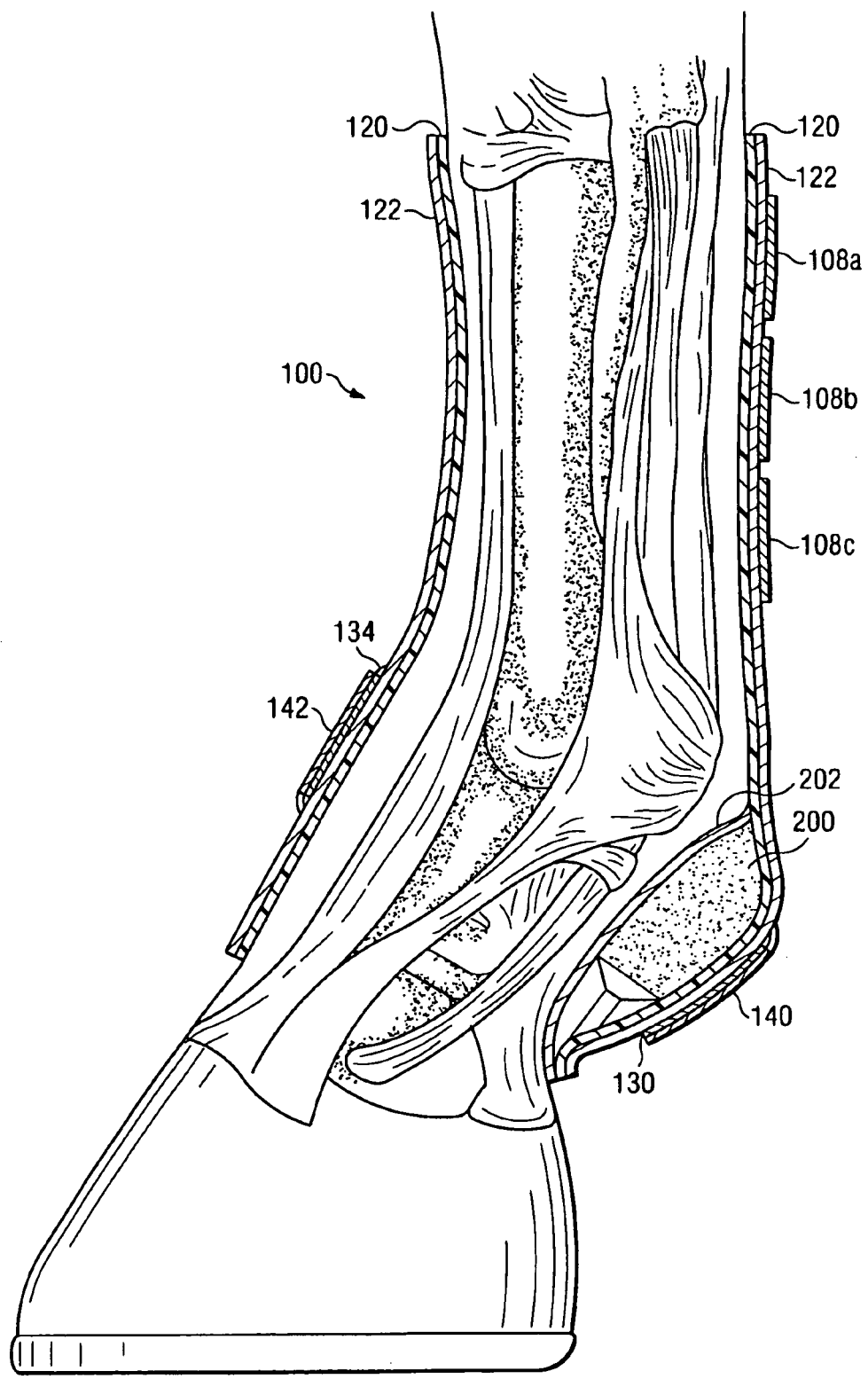
FIG. 5 is a longitudinal cross-sectional view of the support boot of FIG. 1 taken at V-V of FIG. 2 with a portion of the horse's lower leg included to illustrate the general alignment of the support boot.

As shown in FIGS. 2, 4, and 5, orthopedic pad 200 fits snuggly between the palmar/plantar aspect of the proximal pastern and the ventral portion of the sesamoid bones, i.e., the bottom, rear portion of the fetlock joint. This added support restricts the extension of the fetlock joint, thereby decreasing the tensile stress that can occur in the suspensory ligament and the flexor tendons during load-bearing. In FIG. 3, a cross-over attachment configuration of first sling strap 104 and second sling strap 106 is shown. This dual sling-strap configuration provides significant upward forces that pull upward on the lower area of concave portion 110 and orthopedic pad 200. This configuration provides additional resistance to extension of the fetlock joint.

In FIG. 4, the relative location of orthopedic pad 200 and the upward support of first sling strap 104 and second sling strap 106 can be seen. In the preferred embodiment, first connector portion 132 of first sling strap 104 and tab portion 140 of second sling strap 106 form an angle A of about 45° with respect to concave portion 110. It will be appreciated that angle A may vary considerably depending upon the application in which support boot 100 is used.

In FIG. 5, support boot 100 is shown in a longitudinal cross-sectional view taken at V-V of FIG. 2 with a portion of the horse's lower leg included to illustrate the general alignment of support boot 100. As its shown, orthopedic pad 200 is disposed in concave portion 110 and, in the preferred embodiment, is sandwiched between the interior surface of base portion 102 and an interior patch 202. Interior patch 202 is preferably made of a thin layer of neoprene with a knit fabric bonded to the interior surface of the neoprene. The exterior surface of interior patch 202 is preferably bonded to the interior surface of orthopedic pad 200. Interior patch 202 prevents orthopedic pad 200 from being worn or damaged by movement of the horse's fetlock joint. Interior patch 202 may be bonded and/or stitched to base portion 102, and may include suitable edge treating to add durability and comfort to the horse's leg. Orthopedic pad 200 may undergo some deformation during assembly of support boot 100 and may undergo additional deformation during application onto the horse's leg. This deformation, which is shown in FIG. 5, allows orthopedic pad 200 to better conform to the palmar/plantar aspect of the proximal pastern and the ventral portion of the sesamoid bones. It will be appreciated that orthopedic pad 200 is a relatively thick member, i.e., several times thicker than first sling strap 104 or second sling strap 106. The thickness of orthopedic pad 200 ensures that the fetlock joint will be supported and stabilized during use by the horse. Although interior patch has been shown as only covering orthopedic pad 200, it should be understood that interior patch may extend over all or part of base portion 102.

Figure 6A:
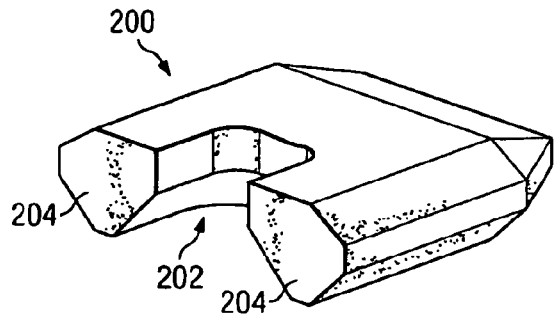
FIGS. 6A-6F are oblique and orthographic views of the orthopedic pad of the support boot of FIG. 1.
Figure 6B:
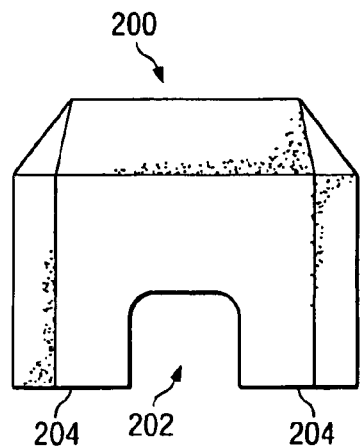
Figure 6C:
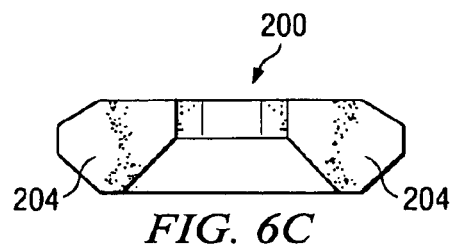
Figure 6D:
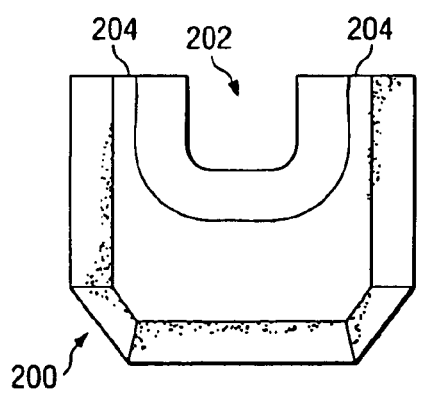
Figure 6E:
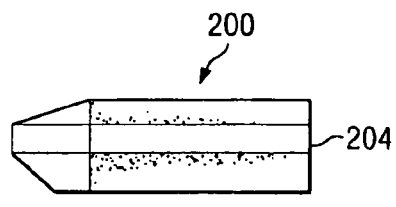
Figure 6F:
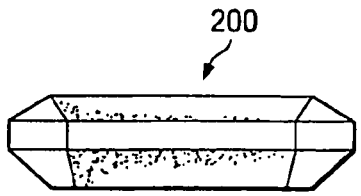
Figure 7A:
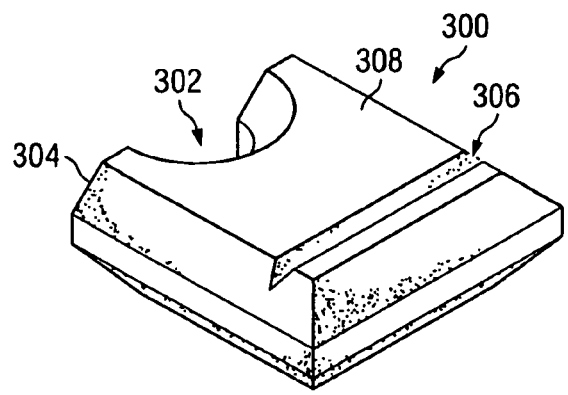
FIGS. 7A-7D are oblique and orthographic views of an alternate embodiment of the orthopedic pad of the support boot of FIG. 1.
Figure 7B:
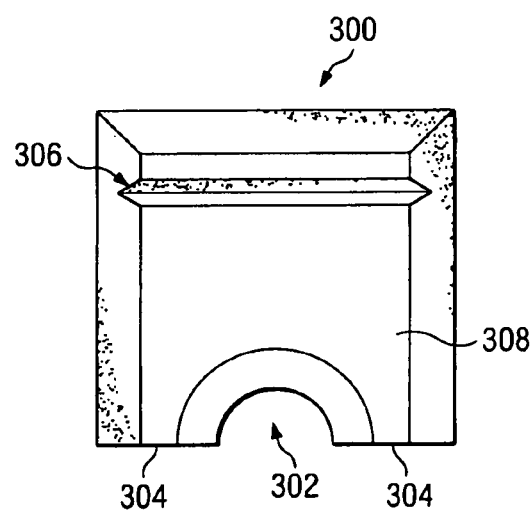
Figure 7C:
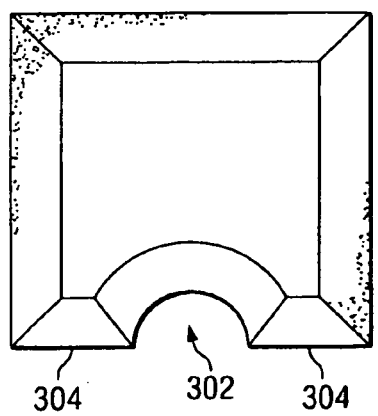
Figure 7D:
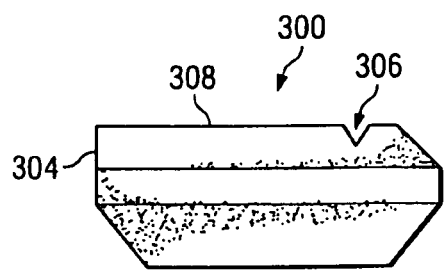

Referring now also to FIGS. 6A-6F in the drawings, orthopedic pad 200 is illustrated in several views. FIG. 6A is an oblique view, FIG. 6B is a top view, FIG. 6C is a front view, and FIG. 6D is a bottom view, FIG. 6E is a left side view, and FIG. 6F is a rear view. Orthopedic pad 200 is generally rectangular in shape with some or all of the edges being beveled or rounded. Orthopedic pad 200 preferably includes a cut-out portion 202 centered along a bottom edge 204. Although cut-out portion 202 is shown as being semicircular in shape, it will be appreciated cut-out portion 202 may take on other shapes and sizes, depending upon the use, application, and desired affect of support boot 100. Orthopedic pad 200 is preferably made of an ethylene-vinyl acetate foam. This allows orthopedic pad 200 to be easily manufactured according to a wide variety of shapes, sizes, and other properties, and allows the performance characteristics of orthopedic pad 200 to be selectively chosen and tailored for particular applications. However, it should be understood that orthopedic pad 200 may be formed of other materials, as well, depending upon the use, application, and desired affect of support boot 100. For example, orthopedic pad 200 may be formed of the same material as base portion 102, and may be formed integrally with base portion 102.

Referring now to FIGS. 7A-7D in the drawings, another embodiment of an orthopedic pad 300 is illustrated. Orthopedic pad 300 is similar to orthopedic pad 200, in that orthopedic pad 300 comprises a cut-out portion 302 disposed along a bottom edge 304. However, orthopedic pad 300 includes an Inwardly extending transverse groove 306 on the upper portion of an interior surface 308. Groove 306 allows orthopedic pad 300 to bend and flex more easily. This feature allows orthopedic pad 300 to be made of stiffer, more durable materials, without detracting from the performance of support boot 100.

Application of support boot 100 to a horse's leg will now be described. First, concave portion 110 and orthopedic pad 200 are located adjacent to and just beneath the fetlock joint of the horse's leg. Then, base portion 102 is wrapped snuggly around the horse's leg and secured in place by attaching upper straps 108a, 108b, and 108c to the exterior surface of loop fabric layer 120. In this step, it is preferred that top edge 112 be aligned as base portion 102 is wrapped around the horse's leg. In addition, in those embodiments in which optional tendon support members 128a and 128b are employed, base portion 102 is arranged such that tendon support members 128a and 128b engage the tendon grooves of the horse's lower leg. Next, first sling strap 104 is stretched underneath concave portion 110 and orthopedic pad 200, pulled around the horse's leg in an upward direction, and secured to the front of base portion 102. In this step, it is preferred that second connector portion 136 be located directly aligned with concave portion 110 and orthopedic pad 200. Then, second sling strap 106 is stretched in the opposite direction underneath concave portion 110 and orthopedic pad 200, pulled around the horse's leg in an upward direction, crossed over first sling strap 104, and secured to both first receiver portion 134 and the front of base portion 102. In this step, it is preferred that fourth connector portion 144 be aligned with second connector portion 136. The cross-over attachment and multiple connection points of first sling strap 104 and second sling strap 106, which is best seen in FIGS. 2 and 3, provides a very secure attachment of support boot 100.

Once applied, support boot 100 covers and protects areas proximal to the fetlock joint and provides support and stability to the horse's leg. Base portion 102 provides support, particularly lateral support, to the flexor tendons and suspensory ligament by decreasing any bowing of these structures during load-bearing. Support boot 100 also provides protection from blunt force injuries, such as over-reach, interference, run-down injuries, and others. Orthopedic pad 200 is secured snuggly between the palmar/plantar aspect of the proximal pastern and the ventral portion of the sesamoid bones, thereby restricting movement of the fetlock joint and providing load-bearing support to the bottom portion of the fetlock joint. This added support decreases the extension of the fetlock joint, thereby decreasing the tensile stress that can occur in the suspensory ligament and the flexor tendons during load-bearing. In addition, orthopedic pad 200 cushions collisions between the horse's fetlock joint and the ground.

It will be appreciated that additional and/or other materials may be utilized to selectively tailor the strength, stiffness, and performance characteristics of support boot 100. For example, additional layers of fabric may be used to add strength. In addition, fabrics with specific directional characteristics, such as composite materials, may be used to selectively tailor the strength and stiffness of support boot 100 in particular directions. As an example, the knit material surrounding base portion 102 may be configured to be stronger and/or stiffer in the longitudinal direction than in the transverse direction. Such a configuration would allow compliance in the transverse direction, but restrict movement in the longitudinal direction.

It is apparent that an invention with significant benefits and advantages has been described and illustrated. The benefits and advantages of support boot 100, include: (1) transverse support of the fetlock joint; (2) upward support for the fetlock joint; (3) restriction of movement of the fetlock joint; (4) cushioning for collisions between the fetlock joint and the ground; and (5) an orthopedic pad that can be used in different types of equine boots, including support boots, skid boots, and splint boots.

The description of support boot 100 has been presented for purposes of illustration and description, and is not intended to be exhaustive or limited to the form disclosed. Although support boot 100 has been shown in a limited number of forms, support boot 100 is not limited to just these forms, but is amenable to various changes and modifications without departing from the spirit thereof. Many modifications and variations will be apparent to those of ordinary skill in the art.

The invention claimed is:

1. An equine support boot for providing localized treatment and protection to isolated portions of a horse leg, comprising:
    a base portion configured to wrap around a fetlock joint of a horse and provide varied levels of localized pressure to ligaments, tendons, and bones above and below the fetlock joint in the horse leg in order to prevent injury and provide therapeutic treatment;
    an upper strap configured to adjustably secure the base portion around a leg of the horse above the fetlock joint;
    a concave portion formed in the base portion adjacent to a bottom edge of the base portion;
    an interior patch bonded to an interior surface of the base portion around the periphery of the concave portion;
    an orthopedic pad configured to conform to a sesamoid bone in the horse leg, the orthopedic pad being disposed in the concave portion below the fetlock joint;
    a first sling strap configured to stretch underneath the concave portion and the orthopedic pad and secure to a front portion of the horse leg, the first sling strap being formed as an elongated extension of the base portion wrapping around an exterior surface of the base portion below the concave portion to apply a selectively adjustable upward force against the pad below the fetlock joint, thus decreasing a tensile stress in the localized area between a palmer/planter aspect of a proximal pastern and a ventral portion of the proximal sesamoid bone; and
    a second sling strap configured to overlap the first sling strap below the fetlock joint and provide an upward force on the concave portion, the second sling strap having:
        a first end fixedly attached to the first sling strap;
        a second end configured to releasably attach to the base portion; and
        a connector portion between the first end and the second end being configured to releasably attach the second sling strap to the first sling strap below the fetlock joint.

2. The equine support boot according to claim 1, wherein the first sling strap wraps around the concave portion in one direction and the second sling strap wraps around the concave portion in the opposite direction.

3. The equine support boot according to claim 2, wherein the first sling strap and the second sling strap form an angle relative to the concave portion of about 45°.

4. The equine support boot according to claim 1, wherein the base portion is formed from a plurality of layers.

5. The equine support boot according to claim 1, wherein the base portion comprises:
    at least one internal layer of neoprene; and
    an exterior loop fabric layer adapted to releasably receive the at least one upper strap and the at least one sling strap as hook and loop type bonds.

6. The equine support boot according to claim 1, wherein the orthopedic pad is formed from an ethylene-vinyl acetate foam.

7. The equine support boot according to claim 1, wherein the orthopedic pad is formed from a compliant material.

8. The equine support boot according to claim 1, further comprising:
    at least one tendon support member carried by the base portion to engage tendon grooves above the fetlock joint, the tendon support members being configured to provide localized lateral support and stabilization to at least one of flexor tendons, a suspensory ligament, a sesamoidean ligament, and a sesamoid bone.

9. The equine support boot according to claim 8, wherein the at least one tendon support member has a selected shape, wherein the shape is a least one of:
    an elongated rib;
    a circular button; and
    an oval ridge.

10. The equine support boot according to claim 8, wherein the at least one tendon support member is removable.

11. The equine support boot according to claim 8, wherein the tendon support member is removeable from the base member.

12. The equine support boot according to claim 1, wherein an exterior surface of the base portion at the concave portion is at least one of coated, treated, and overlaid with a material to prevent damage to base portion.

13. The equine support boot according to claim 1, wherein the orthopedic pad is formed integrally with the base portion.

14. The equine support boot according to claim 1, wherein the orthopedic pad is removeable from the base portion.

15. The equine support boot according to claim 1, wherein the interior patch extends beyond the concave portion.

* * * * *